Nov. 13, 1923.
B. B. GOLDSMITH
1,473,701
INKSTAND FOR SOLUBLE INK
Filed June 14, 1922
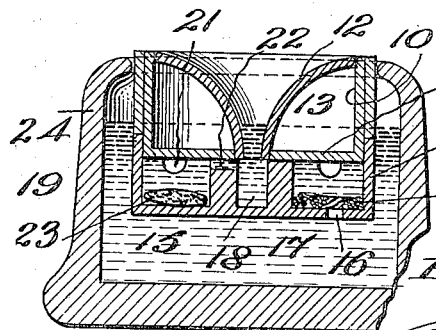
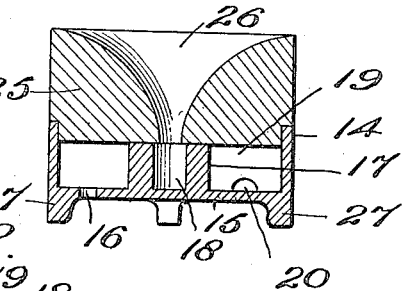
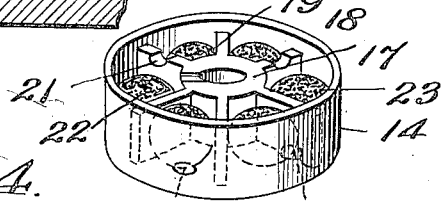
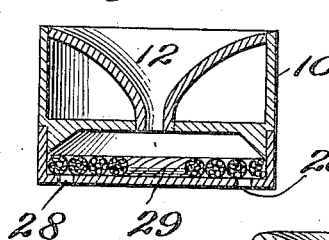
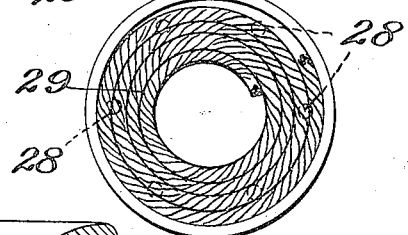
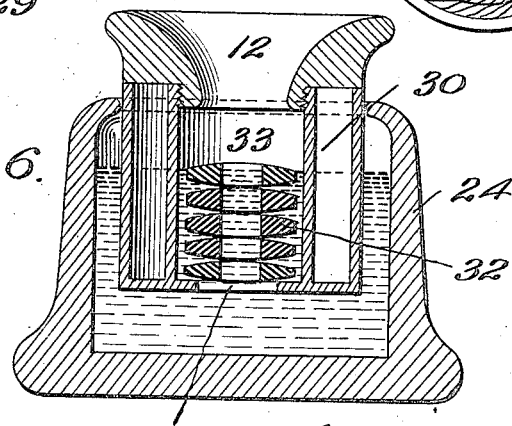
Byron B. Goldsmith
Inventor
By his Attorney Patented Nov. 13, 1923.

1,473,701

UNITED STATES PATENT OFFICE.

BYRON B. GOLDSMITH, OF NEW YORK, N. Y.

INKSTAND FOR SOLUBLE INK.

Continuation of application filed June 28, 1915, Serial No. 330,666. This application filed June 14, 1922. Serial No. 568,290.

*To all whom it may concern:*

Be it known that I, BYRON B. GOLDSMITH, a citizen of the United States, residing in the city, county, and State of New York, have invented certain new and useful Improvements in Inkstands for Soluble Ink, of which the following is a specification.

The object of the present invention is to overcome the objections hitherto incident to the employment of solid ink-producing bodies as substitutes for liquid ink, and to make it possible to obtain an instantaneous supply of clear ink of any desired strength and of uniform quality.

The use of solid ink-producing bodies adapted to afford the consumer a supply of ink when wanted has long been a desideratum for a number of reasons. In the first place, the relative cheapness of distribution is very important. A few cubic inches of ink-producing material will afford a supply of gallons of liquid ink; and, since this solid material can be shipped in boxes or cartons, its use avoids the bulky, heavy and fragile glass containers used in shipping liquid ink. Thus freight charges are greatly diminished, and large losses due to breakage are avoided.

A second and even more important advantage is found in the fact that the solid inks will not freeze. Where liquid ink is supplied, transportation is impossible during certain times of the year, and this is a serious drawback to the ink business. These considerations have brought about efforts to substitute solid ink-producing bodies for liquid inks in commerce, in the expectation that the consumer could produce his own ink by mere addition of water: but prior methods proposed for accomplishing this result have not given satisfaction. This is because the consumer must either shake up a certain quantity of the solid material with water to make a total volume of ink whose strength will depend on experiment, or must employ inkstands of special construction requiring more or less skilled attention to keep in order, or involving in their use great uncertainty as to the strength and quality of the ink produced.

In order to overcome these difficulties I resort to a novel combination of ink-producing bodies with a container so arranged that, as soon as it is immersed in a convenient body of clear water, the dipping space within the container is supplied with clear ink of a uniform quality predetermined by the structure of the combination itself. In my improvement, the water finds its level by passing through a passage or passages in the container in such a way that all the water that reaches the dipping space is forced to pass over or through the ink-producing bodies carried in the container. The strength of the ink is controlled by a proper proportioning of the openings and of the ink-producing bodies. It follows, therefore, that I supply a device capable of instant use by simple immersion in water and permitting certain and satisfactory results without any experiment or trouble on the part of the consumer.

This application is a continuation of my prior application first filed June 28th, 1915 and renewed October 14th, 1919, Serial No. 330,666.

Some of the many forms in which my invention may be embodied are illustrated in the accompanying drawings wherein Figure 1 is a median section through one form of container shown immersed, Figure 2 is a perspective view of the lower part of said container, Figures 3 and 4 are sectional views of modifications, Figure 5 is a plan view of the lower portion of the device shown in Figure 4, and Figure 6 is a vertical sectional view of another modification.

The form shown in Figures 1 and 2 comprises an upper section, made of hard rubber or other suitable material and provided with an outer cylindrical wall 10 and a bottom 11 centrally pierced, as shown. An interior funnel 12 flares outward from the central aperture and joins the top edge of the cylindrical wall 10, producing a dipping space surrounded by a closed air chamber 13.

The top section fits into the cylindrical wall 14 of a lower section shown in perspective in Figure 2. This lower section is closed at the bottom by a flat disc 15 which has an admission opening 16 and the same is provided with a central core 17 having a central opening 18, the top of which registers with the bottom of the funnel 12 when the two sections of the ink stand are assembled.

Radiating from the central core outward to the wall 14 and extending vertically from the bottom 11 of the upper section to the bottom 15 of the lower section, are partitions 19, which are supplied with openings, preferably semi-circular, to permit communication from one of the chambers between said partitions to another. These openings are alternately at the bottom of a partition as shown at 20 and at the top of the next partition as shown at 21. One of the partitions confining the chamber to which access is had through the inlet openings 16, has no opening 20 or 21, and the chamber on one side of said partition communicates through the opening 22 with the central opening 18 in the core 17.

Soluble ink-producing bodies 23 of suitable shape, are placed in the various chambers between the partitions 19 and, the two sections having been assembled as shown in Figure 1, they are immersed in a body of water in an outer vessel 24, which may be of any convenient form, for instance, as shown in Figure 1.

The two sections, as so assembled, will of course, sink to a certain level, approximately as shown in Figure 1, and the pressure of the outside water will cause it to flow in at the opening 16 alternately over and under all the partitions but the last, and thus past all the ink-producing bodies 23 until the water reaches the opening 22 when it will find its level in the central opening 18 to enter the funnel 12 above. It is obvious that in its travel through the chambers, the water will flow around and under the various ink bodies 23, so that by the time it reaches the funnel 12, it will be thoroughly impregnated with the soluble ink. When the ink bodies have been entirely dissolved or nearly so, the movable portion of the stand can be taken out of the water, after which it can be taken apart and new ink-producing bodies inserted.

The form shown in Figure 3 is the same as above described save that it is not intended to float in the surrounding vessel but is provided with a solid upper section 25 having a funnel 26 formed in its upper surface. Legs 27 are also supplied to hold the main body of the device above the bottom of the external vessel so that the water may freely reach the opening 16.

In the modification shown in Figures 4 and 5, the lower section has a single chamber to which access is had through any convenient number of holes 28 in the bottom, and a suitable ink-producing body or bodies of ink is or are placed in said chamber. In the form shown a spirally placed mass of flexible material, impregnated with the soluble ink, is shown at 29. I have found this a convenient form in which to supply the ink mass.

In the form shown in Figure 6, the air chamber is shown at 30, in the lower section of the magazine, and the central chamber in its lower section is shown at 31 open to entrance of water. A circular shelf is afforded, upon which rests a succession of vertically piled ink-producing bodies 32 centrally bored so as to form a dipping space 33. The ink rises through this central opening and around the ink-producing bodies, being impregnated as it flows upward. Obviously this same principle can be applied in a form not providing for the flotation of a part of the ink stand. Such a form would be analogous to what is shown in Figure 3.

It is obvious that the ink-producing bodies may be of various forms and very good results are achieved by applying them to a suitable backing or foundation, as well as impregnating absorbent material with them. The sizes of these bodies, and the openings in them as well as their relation to the passage or passages containing them can be so calculated as to regulate the speed of flow of water, and so determine the strength of the ink. In my method of ink supply, the ink is produced progressively as it is consumed. Each penful of ink removed from the dipping space is replaced automatically by hydraulic pressure from without, whereby a new supply of fresh water enters the container.

What I claim is—

1. In apparatus for producing ink progressively as it is consumed, a casing having a dipping space accessible from above, and having a passage communicating with the lower part of said dipping space, said passage having an external opening for admission of water, said opening being below the level of the top of said dipping space; in combination with one or more ink-producing bodies placed in said passage, all arranged substantially as described, whereby when the casing is immersed all the water that finds its level in said dipping space is caused to move through said passage and past said ink-producing bodies.

2. Apparatus of the character set forth in claim 1, wherein the passage for the ink-producing bodies comprises a number of chambers each adapted to contain one of the ink-producing bodies, said chambers communicating from one to the other continually by restricted openings.

3. In apparatus of the character described, a casing provided with a central hub having an opening, partitions radiating from said hub and all but one pierced alternately at top and bottom, said casing having inlet and outlet openings on opposite sides of the single unpierced partition.

4. In apparatus of the character described, a casing having a dipping space and a section pierced for admission of water and divided into a series of communicating chambers whose terminal members are in communication with the dipping space and the exterior of the casing respectively, and an ink-producing body in each chamber.

5. In apparatus of the character described, a casing having a dipping space and a removable bottom section perforated for the admission of water and provided with one or more masses of ink-producing material.

In testimony whereof I have hereto set my hand on this 12th day of June 1922.

BYRON B. GOLDSMITH.